(12) United States Patent
Borko et al.

(10) Patent No.: US 10,403,167 B2
(45) Date of Patent: Sep. 3, 2019

(54) FRET LIGHTING DEVICE

(71) Applicant: Edge Tech Labs, LLC, Arlington, VA (US)

(72) Inventors: Brandon Borko, Arlington, VA (US); John Tolly, Arlington, VA (US); Shaun Masavage, Arlington, VA (US)

(73) Assignee: EDGE TECH LABS, LLC, Arlington, VA (US)

( * ) Notice: Subject to any disclaimer, the term of this patent is extended or adjusted under 35 U.S.C. 154(b) by 0 days.

(21) Appl. No.: 15/958,571

(22) Filed: Apr. 20, 2018

(65) Prior Publication Data

US 2018/0308380 A1  Oct. 25, 2018

Related U.S. Application Data

(60) Provisional application No. 62/487,737, filed on Apr. 20, 2017.

(51) Int. Cl.
| | | |
|---|---|---|
| *G09B 15/02* | (2006.01) | |
| *G10D 1/00* | (2006.01) | |
| *G10H 1/00* | (2006.01) | |
| *G10D 3/06* | (2006.01) | |
| *G10D 1/02* | (2006.01) | |
| *G10D 1/08* | (2006.01) | |
| *G10G 1/02* | (2006.01) | |

(52) U.S. Cl.
CPC .......... *G09B 15/023* (2013.01); *G10D 1/005* (2013.01); *G10D 1/02* (2013.01); *G10D 1/08* (2013.01); *G10D 1/085* (2013.01); *G10D 3/06* (2013.01); *G10G 1/02* (2013.01); *G10H 1/0016* (2013.01); *G10H 2220/051* (2013.01)

(58) Field of Classification Search
CPC ........ G09B 15/023; G10D 1/085; G10D 1/02; G10D 3/06; G10D 1/005; G10H 1/0016
See application file for complete search history.

(56) References Cited

U.S. PATENT DOCUMENTS

| | | |
|---|---|---|
| 4,040,324 A | 8/1977 | Green |
| 4,314,499 A | 2/1982 | Olsen |
| 4,428,269 A | 1/1984 | Bione et al. |
| 4,480,521 A | 11/1984 | Schmoyer |
| 5,305,674 A | 4/1994 | Fishman |

(Continued)

FOREIGN PATENT DOCUMENTS

WO     2014/020629 A1    2/2014

*Primary Examiner* — Kimberly R Lockett

(74) *Attorney, Agent, or Firm* — Ziegler IP Law Group, LLC

(57) ABSTRACT

A learning device assembly for a stringed instrument includes one or more light strip members, at least one light element in the one or more light strips, a connecting member electrically connected to the one or more light strip members, a controller electrically connected to the connecting member and configured to electrically drive the at least one light element in the one or more light strip members and a computing device communicatively coupled to the controller, the computing device configured to be programmed with or more music arrangements and enable the controller to illuminate one or more of the at least one light element in the one or more light strip members to enable a playing of one or more music arrangements on the stringed instrument.

18 Claims, 14 Drawing Sheets

(56) References Cited

U.S. PATENT DOCUMENTS

| | | |
|---|---|---|
| 5,337,644 A | 8/1994 | Fishman |
| 5,440,071 A | 8/1995 | Johnson |
| 5,841,053 A | 11/1998 | Johnson et al. |
| 6,080,925 A | 6/2000 | Rogers et al. |
| 6,191,348 B1* | 2/2001 | Johnson ............... G09B 15/004 84/477 R |
| 6,348,649 B1 | 2/2002 | Chen et al. |
| 7,671,265 B2 | 3/2010 | Herrick |
| 8,008,563 B1 | 8/2011 | Hastings |
| 8,399,756 B1* | 3/2013 | Trent ...................... G10D 3/06 84/314 R |
| 8,779,268 B2 | 7/2014 | Serletic et al. |
| 8,901,405 B1 | 12/2014 | McCarthy |
| 8,901,409 B2 | 12/2014 | Helgesson |
| 8,907,195 B1 | 12/2014 | Erol |
| 9,583,084 B1 | 2/2017 | Fagan |
| 9,613,541 B1 | 4/2017 | Badilla-Bradford |
| 9,847,041 B2 | 12/2017 | Badilla-Bradford |
| 2006/0249008 A1 | 11/2006 | Luther |
| 2013/0068086 A1 | 3/2013 | Mittelstadt et al. |
| 2014/0137721 A1 | 5/2014 | Little et al. |
| 2018/0061266 A1* | 3/2018 | Badilla-Bradford ........................ G09B 15/004 |

* cited by examiner

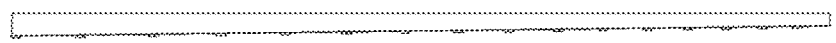
FIG. 11

FRET LIGHTING DEVICE

BACKGROUND

Field

The aspects of the disclosed embodiments generally relate to wireless light emitting diode (LED) display circuits, and more particularly to a portable display device that can function as a learning tool or guide for stringed and fretted musical instruments.

Description of Related Developments

Learning to play guitar and other fretted or stringed instruments can be a daunting endeavor for aspiring musicians. Traditional teaching methods involve significant human instruction and time consuming repetitive placement and memorization exercises in order to learn any new finger placement or technique.

To date, devices utilizing LED display technology are built into physical guitars, which aside from requiring a custom manufactured guitar, typically results in a lower quality musical instrument. It would be advantageous to provide a stringed instrument learning tool that does not require modification of the stringed instrument itself.

Accordingly, it would be desirable to provide a learning tool or guide for a fretted or stringed instrument that addresses at least some of the problems identified above.

SUMMARY

The aspects of the disclosed embodiments provide a small sized, portable display device that can be installed on existing fretted and stringed instruments and overcomes the drawbacks of the prior art. The device of the disclosed embodiment, generally referred to herein as a portable fret lighting and display device or assembly, is configured to be controlled wirelessly via a smartphone and used to display LED cues in a manner that is readily understood.

In a first aspect, the disclosed embodiments are directed to a learning device assembly for a stringed instrument, that includes one or more light strip members, at least one light element in the one or more light strips, a connecting member electrically connected to the one or more light strip members, a controller electrically connected to the connecting member and configured to electrically drive the at least one light element in the one or more light strip members and a computing device communicatively coupled to the controller. The computing device is configured to be programmed with one or more music arrangements and enable the controller to illuminate one or more of the at least one light elements in the one or more light strip members at different times to enable the user to be guided in the playing of the music on the stringed instrument.

In one embodiment the at least one light elements are LED lights.

In one embodiment the computing device is a mobile communication device that is running an application and controls the lighting of the LEDs to correspond to the playing of the music notes for music arrangement and is wirelessly coupled to the controller.

In one embodiment the LEDs are disposed on one side of the one or more light strip members and an other side of the one or more light strip members comprises an adhesive that allows the device to be removably mounted to the music instrument.

In one embodiment the one or more light strip members are removably connected to the connecting member, which can be a wiring harness, for example.

In one embodiment the one or more light strip members are configured to be disposed adjacent to, and horizontally aligned relative to, a fret member of the stringed instrument. The light strip member is generally aligned to extend along the same direction as a respective fret and is positioned just above or below the fret.

In one embodiment a number of the one or more light strip members correspond to the number of frets on the stringed instrument. There is typically one light strip for each fret.

In one embodiment a light element of the at least one light element is aligned with a respective string of the stringed instrument. The light element or LED, when illuminated, will indicate which string or strings to press. Thus, there will be an LED positioned close to or directly underneath the respective string.

In one embodiment a number of light elements in a light strip member correspond to a number of strings of the stringed instrument. The light strip will typically have one LED per string.

In one embodiment the connecting strip includes at least one microcontroller corresponding to respective ones of the one or more light strip members. The microcontroller(s) are configured to drive the light element based on non-transitory computer readable instructions received from the controller.

In one embodiment the microcontroller is configured to illuminate different ones of the at least one light element at different times and for different time periods based on the non-transitory computer readable instructions received from the controller.

In one embodiment the stringed instrument is a guitar.

In one embodiment the connecting member comprises a flexible printed circuit board member and is configured to wrap at least partially around a neck member of the stringed instrument.

In one embodiment the connecting member is arranged perpendicular relative to the one or more light strip members, and is configured to be disposed along a side of the neck member of the stringed instrument.

In one embodiment the controller is configured to cause an illumination of different light elements of the at least one light element that correspond to different strings of the string musical instrument as programmed by the mobile application on the computing device and guide the user as to pressing of the different strings to play different chords.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which:

FIG. 11 is a left side view of an exemplary fret lighting device incorporating aspects of the disclosed embodiments mounted on a guitar. The figure shows the exemplary fret lighting device in an installed orientation where the flexible circuit board would be bent approximately 90 degrees around one side of a guitar neck.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION

As described herein, the exemplary embodiments overcome one or more of the above or other disadvantages known in the art.

The aspects of the disclosed embodiments are directed to a portable fret board display or lighting device that can be controlled wirelessly via a smartphone and used to display light or LED cues on a stringed instrument. This light cues or LEDs can include various colors, brightness levels, timings, phasing, and patterns. The fret board display device of the disclosed embodiments provides a small form factor that does not interfere or impede a player's ability to play the fretted instrument. The overall design of the fret board display device of the disclosed embodiments is convenient, battery-powered, and mounted in such a way that they player does not feel it on their body in any playing configuration. The device is installed on the instrument without causing any damage to the instrument or any permanent modifications to the instrument.

Figure 1:
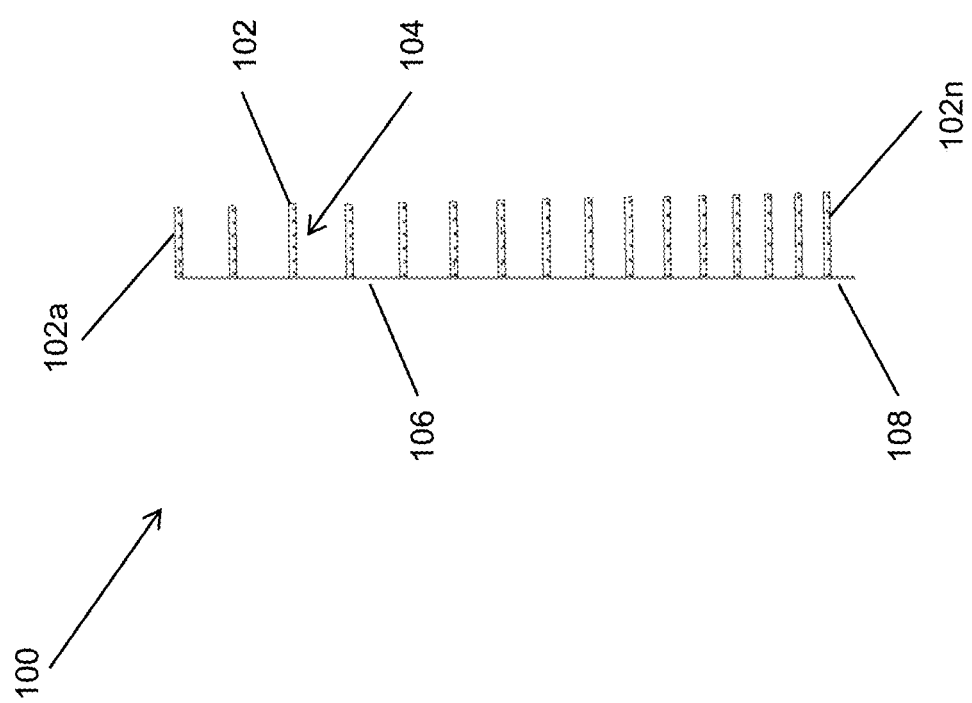
FIG. 1 is a front view of an exemplary fret lighting device incorporating aspects of the disclosed embodiments.
Figure 2:
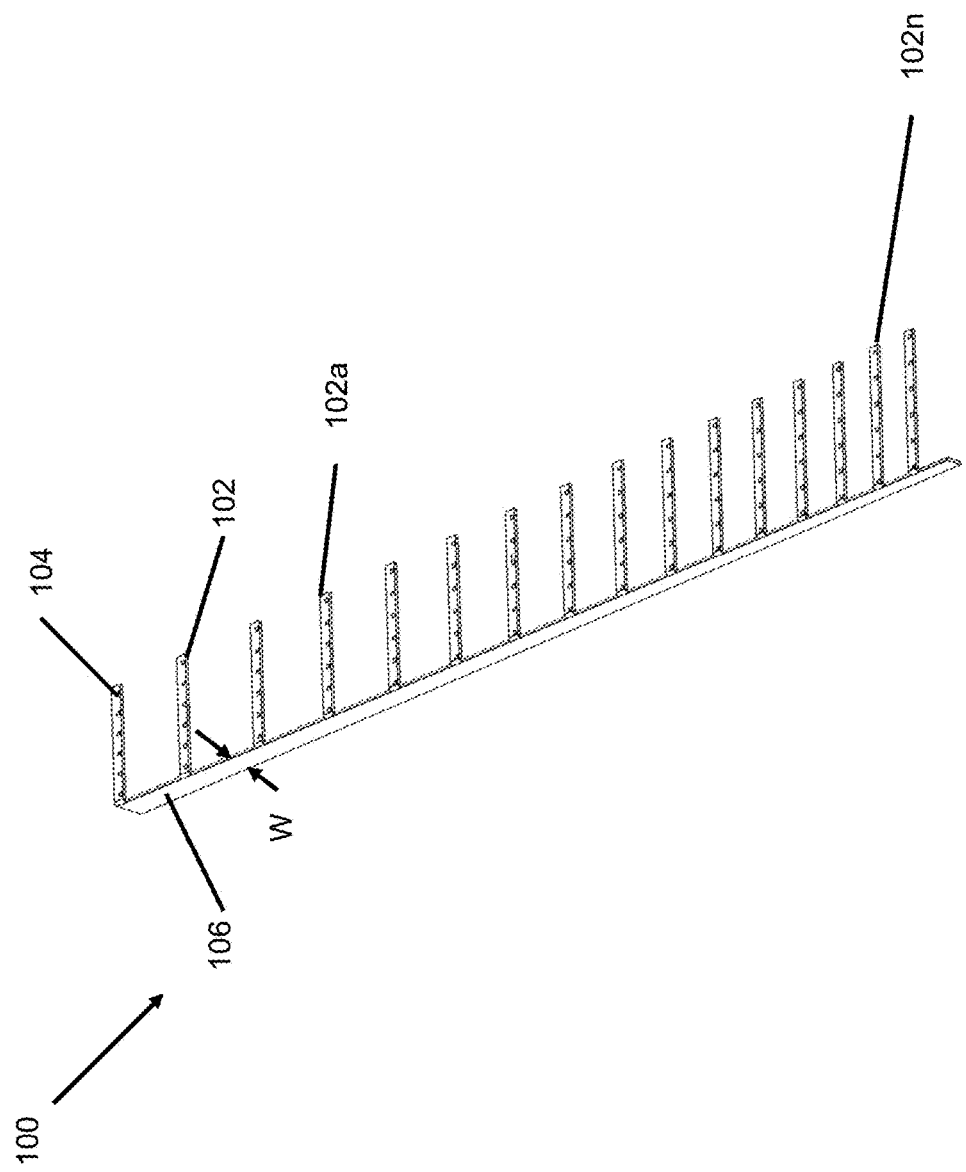
FIG. 2 is a perspective view an exemplary fret lighting device incorporating aspects of the disclosed embodiments.

FIGS. 1 and 2 illustrate exemplary fret board display or lighting devices 100 incorporating aspects of the disclosed embodiments. The fret board display device 100 of the disclosed embodiments is generally configured to be programmed to illuminate different light elements 104 of the display or light device 100 that correspond to the different strings of a musical instrument. The sequenced illumination of the different light elements 104 will guide the user as to placement of their fingers in order to play different chords. As will be further described herein, the device 100 can be programmed to illuminate the different light elements 104 of the device 100 that will guide the user in the position of fingers to allow the user to play chords, songs or other exercises in a variety of different manners. The device 100 thus provides a stringed instrument learning or guide tool.

The device 100 generally includes a number of lighted guide strip members 102, generally referred to herein as lighted or lighting strips. The number of strips 102 that comprise the device 100 generally correspond to the number of frets on the musical device, such as a guitar, as that term is generally understood. In the examples of FIGS. 1 and 2, there are 16 light strips 102, although that number can vary based on the type of musical instrument and the number of frets on the musical instrument. Although the aspects of the disclosed embodiments are generally described herein with respect to fretted musical devices, the aspects of the disclosed embodiments are not so limited. The device 100 can be applied to any suitable stringed musical instrument, other than including fretted instruments. For example, some stringed musical instruments such as violins or cellos may not include frets. The device 100 of the disclosed embodiments can be configured for use with such non-fretted instruments.

The dimensions of the device 100 and the number of strips 102 will generally be configured to accommodate the desired musical instrument. In one embodiment, one or more of the strips 102 can be configured to be connected and disconnected from the connecting strip member 106 of the device 100, as well as reconnected. In this manner, the size of the device 100, and the number of strips 102 can be varied to accommodate the particular musical instrument and enhance portability.

The length of each one of the strip members 102 will generally correspond to the width of the neck of the particular musical device, such as a guitar, on which the fret device 100 is disposed. Thus, one strip member, such as 102a can have one length, while another strip member 102n can have another length. The spacing between adjacent strip members 102 can be configured to be the same or vary, depending up the specific musical instrument application.

The strip members 102 generally include one or more lighting elements 104. The light or lighting elements 104 are generally disposed or aligned so that they are visible to a user of the device 100 when the light elements 104 are energized or illuminated. In the example of FIG. 1, there are six (6) lighting elements 104 per strip member 102. In alternate embodiments, the number of lighting elements 104 per strip member 102 can vary, depending upon the number of strings on the musical instrument.

In one embodiment, as shown in FIG. 1, the lighted strips 102 are electrically connected together by a connecting strip member 106. The connecting strip member 106 can include one or more electrically conducting members as well as other circuit elements that may be needed to drive the light elements 104 as well as interface with a controller or control device, such as the control device 402 shown in FIG. 4. As will be described further below, the control device 402 is generally configured to drive the light elements 104 to illuminate in a specific sequence to guide the user in the playing of music. In some instances, the control device 402 can also power the light elements 104. In one embodiment, as illustrated in FIG. 2, and as further described below, the connecting strip member 106 can have a width W that allows the connecting strip member 106 to be at least partially wrapped around the neck of the musical instrument.

Figure 3:
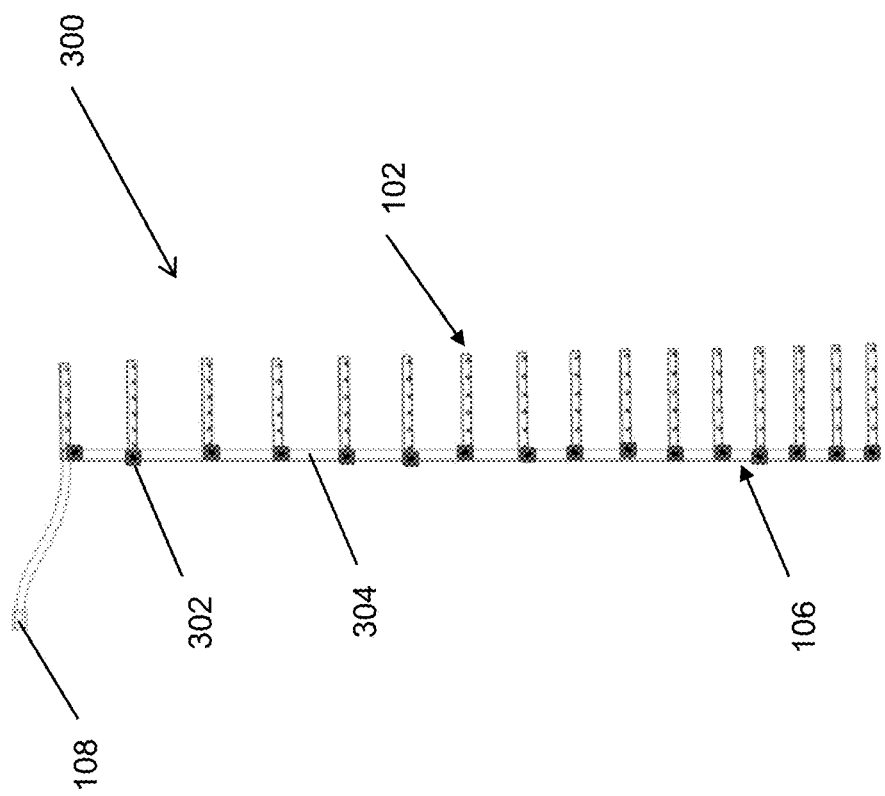
FIG. 3 is a circuit assembly view of an exemplary fret lighting device incorporating aspects of the disclosed embodiments.

As shown in the examples of FIGS. 1 and 3, in one embodiment, one or more ends of the connecting strip 106 can be a connector end 108, where a physical connection to the control device 402 is required. The connector end 108 of the connecting strip 106 allows the device 100 to be connected to one or more of the control device 402 and power source, as needed. In alternate embodiments, where the device 100 is configured to be wirelessly controlled, the connecting strip 106 does not include a connector end.

The light elements 104 generally comprise any suitable light that can be used to guide the user in the placement of their fingers relative to the strings of the musical instrument in order to play notes, or music. The light elements 104 will generally comprise a small form factor to make the overall size of the device 100 compact and portable. In one embodiment, the light elements 104 are light emitting diode (LED) devices.

In one embodiment, the color of the different light elements 104 can be the same color, provided the illuminated light element(s) 104 can readily be perceived by the user. In alternate embodiments, different ones of the light element(s) 104 can have different colors. For example, the light elements 104 of the different strips 102 that correspond to the same guitar string can all have the same color. Any one of a different number of combinations of colors for the light elements 104 are envisioned in order to guide the user in the playing of the instrument.

Figure 5:
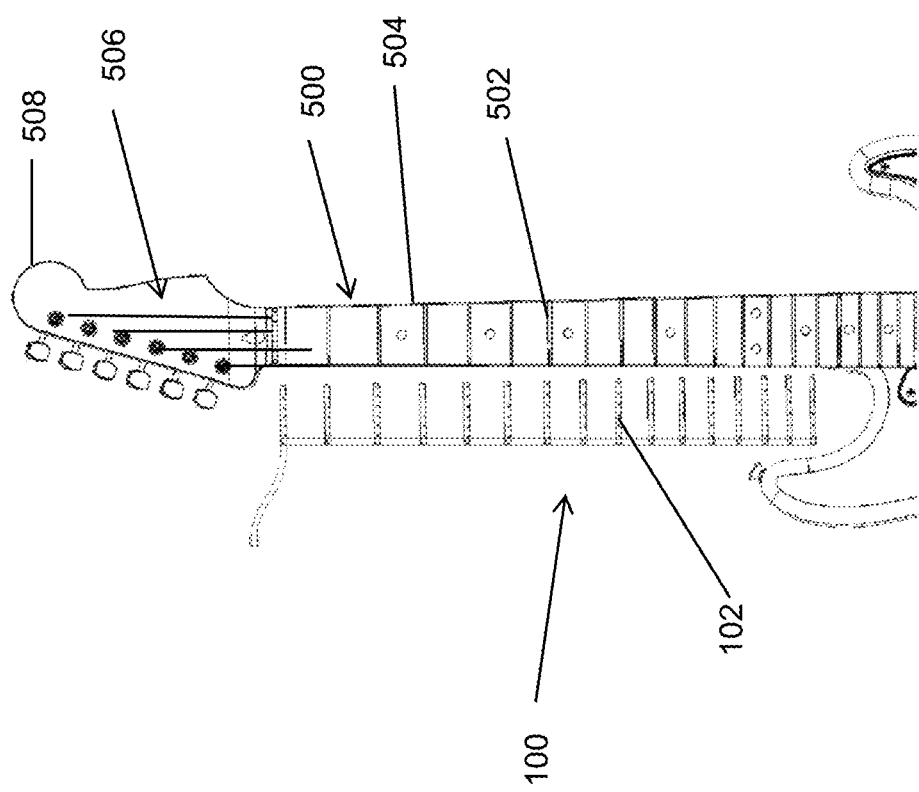
FIG. 5 illustrates an exemplary fret lighting device incorporating aspects of the disclosed embodiments.
Figure 6:
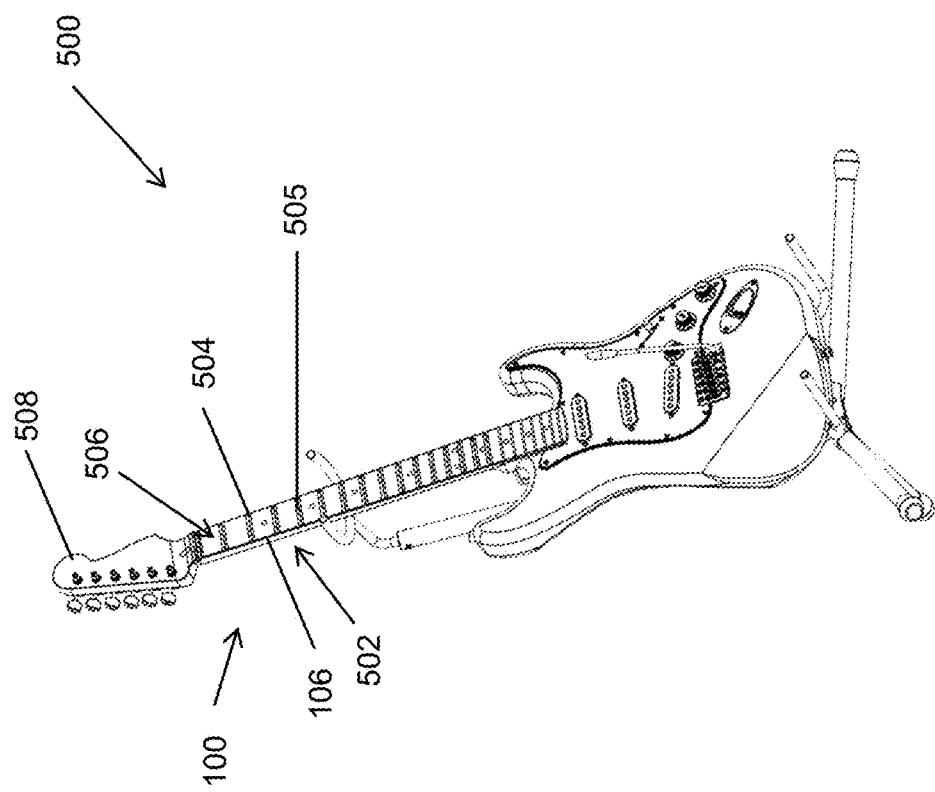
FIG. 6 illustrates an exemplary fret lighting device incorporating aspects of the disclosed embodiments mounted on a guitar.
Figure 7:
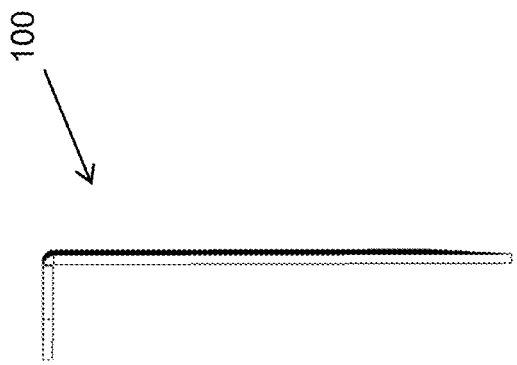
FIG. 7 is an end view of an exemplary fret lighting device incorporating aspects of the disclosed embodiments. The figure shows the exemplary fret lighting device in an installed orientation where the flexible circuit board would be bent approximately 90 degrees around one side of a guitar neck.
Figure 8:
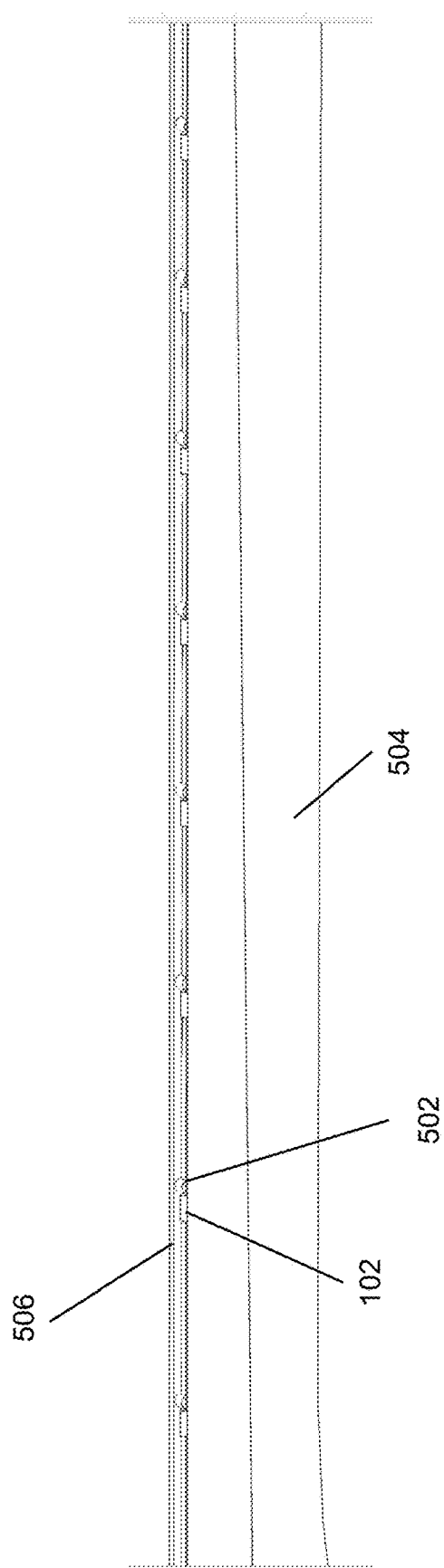
FIG. 8 is a right side perpendicular view of an exemplary fret lighting device incorporating aspects of the disclosed embodiments mounted on a guitar. This side has the LED strips connected to the portion that wraps around the side of the guitar neck.
Figure 9:
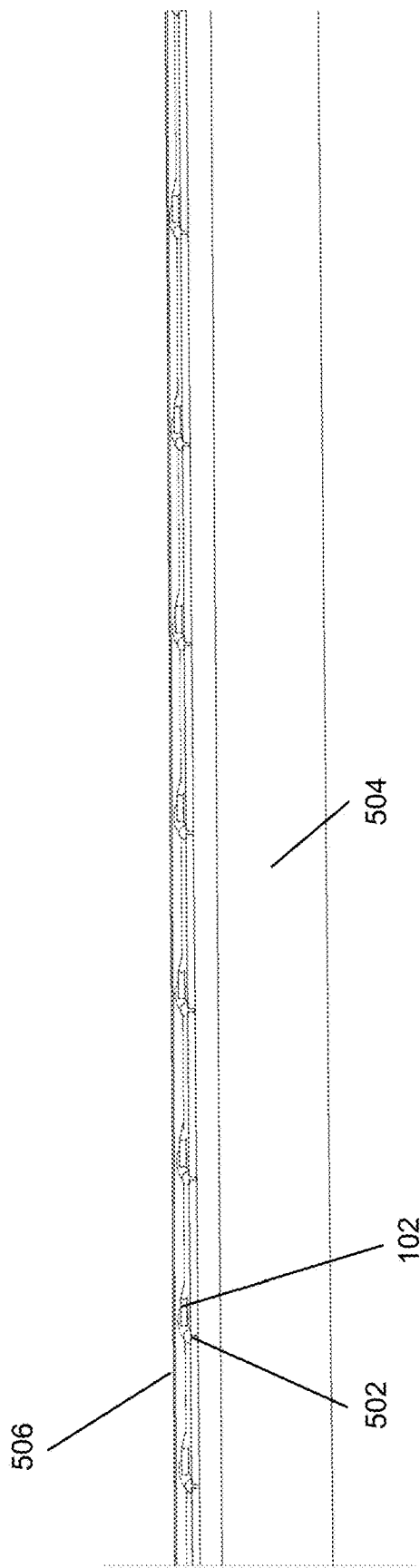
FIG. 9 is a left side perpendicular view of an exemplary fret lighting device incorporating aspects of the disclosed embodiments mounted on a guitar. This side does not have any elements wrapping around the side of the guitar neck.
Figure 10:
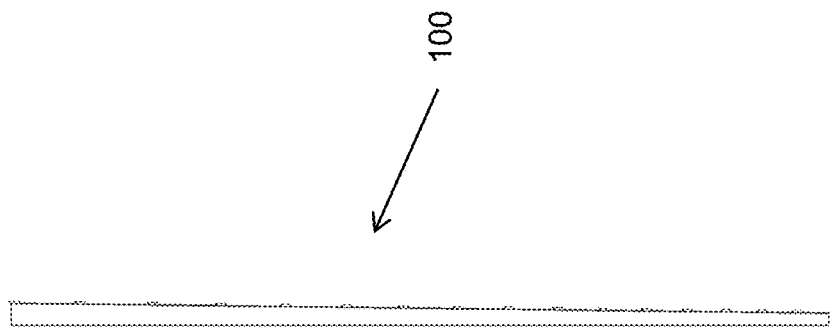
FIG. 10 is a right side view of an exemplary fret lighting device incorporating aspects of the disclosed embodiments mounted on a guitar. The figure shows the exemplary fret lighting device in an installed orientation where the flexible circuit board would be bent approximately 90 degrees around one side of a guitar neck.

The fret lighting display device 100 of the disclosed embodiments generally incorporates full-spectrum LEDs capable of displaying any color combination at any brightness level. Referring also to FIGS. 5 and 6, and as will be described in more detail below, these light elements 104, or LEDs, are arranged on the respective light strips 104 in a pattern such that they lie approximately below each string 506 on a guitar 500 and just above the frets 504, on the side closer to the head stock 508 of the guitar 500.

FIG. 3 illustrates a circuit assembly 300 for the fret device 100 of FIG. 1. In this example, the circuit assembly 300 includes one or more microcontrollers 302. In the example of FIG. 3, a microcontroller 302 is connected between the connecting strip 106 and the corresponding light strip 102. The microcontrollers 302 provide both power and communication instructions to the LEDs 104. For example, one microcontroller 302 can be used per LED strip 102 running along each fret, but it is possible in other embodiments to control multiple strips 102 of LEDs 104 with fewer or a single microcontroller 302.

In one embodiment, there is a coating on the fret lighting display device 100 to protect the electronics on the circuit assembly 300. This coating may take many forms including conformal coating, rubber, tape, epoxy, or any other material generally capable of performing as a coating or functioning as an enclosure. In one embodiment, the coating can protect the electronics from environmental issues, such as for example, dirt and liquid.

The connecting strip 106 in this example comprises a flexible circuit board member 304 that electrically connects to the light strips 102. In one embodiment, the flexible circuit board member 304 and the connector strip 106 are configured to wrap around at least a portion of a side of the instrument, such as the neck of a guitar.

The connector end 108 of the connector strip 106 in this example is configured to connect to one or more of a power supply and a control module. In one embodiment, the power supply can be a battery. As will be discussed further below, the control device or controller 402 shown in FIG. 4 can include one or more of a power supply and control module.

Figure 4:
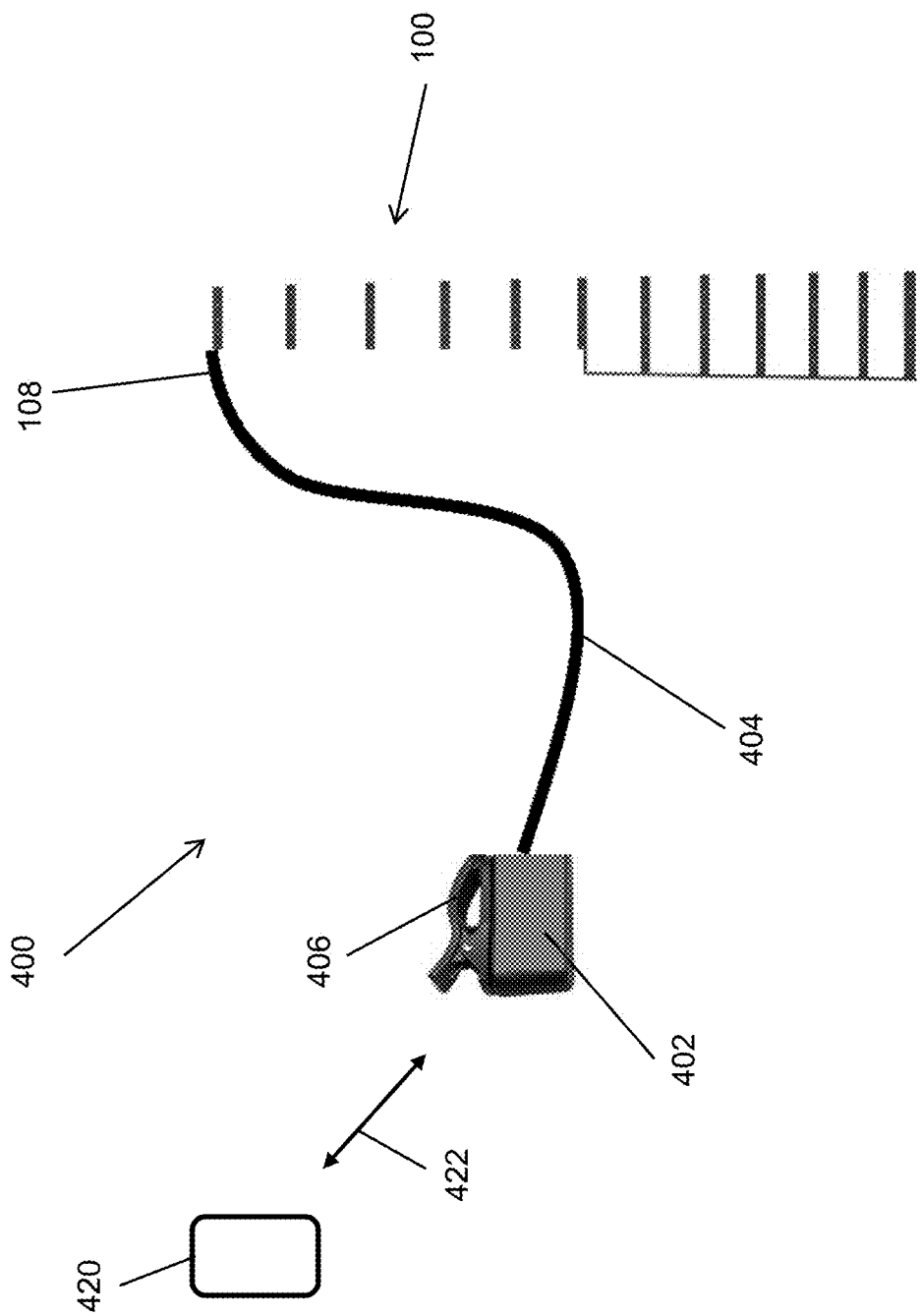
FIG. 4 is an assembly view of the view of an exemplary fret lighting device incorporating aspects of the disclosed embodiments coupled with a control module and power supply.

FIG. 4 illustrates one embodiment of the fret device 100 connected to a controller 402 to form an assembled device or assembly 400. The assembly 400 of the disclosed embodiments generally comprises two components: the fret lighting display device 100 and a battery and control module, or controller 402 for powering the fret lighting display device 100.

The controller 402 in this example can include one or more of a control module to control the fret device 100 as is described herein and a power supply to provide power to the fret device 100, and in particular the light strips 102 and light elements 104 illustrated in FIG. 1.

A suitable wiring harness 404 or other wiring can be used to connect the controller 402 to the connector end 108 of the fret device 100. In one embodiment the wiring harness 404 comprises a cable, such as a connection cable between the controller 402 and the fret display device 100. The cable 404 can vary in size and length per the desired installation parameters. In one embodiment, there is a connector or socket on the controller 402 into which the cable 404 plugs. In this manner, the controller 402 can be disposed at any suitable or desired distance from or in proximity to the fret lighting device 100. As shown in FIG. 4, the wiring harness 404 will electrically connect to the connecting strip 106.

The fret lighting device 100 in the example of FIG. 4 is an LED display device. In alternate embodiment, this LED display device may be of different sizes in length, width, and height. This can allow the fret lighting device 100 to be sized to any one of a number of different stringed musical instruments. The fret lighting device 100 can also have different numbers of LEDs 104 in or on each strip 102.

The power supply or source in the controller 402 can be any suitable power supply. This can include a battery or other energy source, such as a solar power storage and generating module. Advantageously, the device 100 of the disclosed embodiments is powered by a small rechargeable battery to ensure that the entire apparatus assembly 400 is wireless. In one embodiment, the battery life should exceed twelve hours or such other suitable or desired time period.

The size of the controller 402 and housing can be any suitable size depending upon the application. In alternate embodiments, the controller 402 and housing for the controller 402 may be any functional size, which may vary based on desired internal components and battery size. While the aspects of the disclosed embodiments are generally described herein as including a battery, in alternate embodiments, other power supply can be included. This can include external power supplies.

The material of the body of the battery and control module 402 can generally be comprised of an ABS plastic. In alternate embodiments, any suitable material can be used. The material of the coating on the light strips 102 or LED display portion can generally be a type of flexible glue, but in alternate embodiments, any suitable material can be used such as, for example, rubber or plastic.

In the example of FIG. 4, a clip device 406 can be used to attach the controller 402 to the musical device, such as a guitar. In this manner, the form of the assembly 400 remains compact and can be configured not to interfere with the user of the assembly 400 while playing the musical instrument. In alternate embodiments, any suitable manner of securing the controller 402 to the musical instrument can be used, other than including a clip. For example, an adhesive, a magnet assembly, suction cup or Velcro can be used.

FIGS. 5 and 6 illustrate one example of a fret lighting device 100 disposed in connection with a fret 502 of a musical instrument 500, which in this example is a guitar. The fret lighting display device 100 of the disclosed embodiments is configured to be mounted on a musical instrument 500 in a semi-permanent or removable manner. For example, a semi-permanent adhesive can be used that may be removed or allows the fret lighting display device 100 to be removed, and does not cause damage to the surface of the instrument 500 to which it is mounted.

In one embodiment, the fret lighting device 100 is attached to the musical instrument 500 similar to how one would apply a cell phone screen protector. For example, a protective tape over the adhesive on the back of the fret lighting device 100 is removed and the fret lighting display device 100 is pressed down on the neck portion 504 instrument 500 such that the light strips 102 align with the frets 502 and the light elements 104 of each strip 102 align with the respective strings 506 of the instrument 500. Removal of strings 506 is recommended before installation of the fret lighting display device 100.

The connector end 108 of the fret lighting display device 100 is then connected to the controller 402 shown in FIG. 4. The controller 402 can then be mounted to the instrument 500.

While the musical instrument 500 shown and described herein is generally referred to as a guitar, the aspects of the disclosed embodiments are not so limited. The musical instrument 500 can generally include any stringed musical instrument, such as electric guitars, acoustic guitars, classical guitars, bass guitars, ukuleles, banjos, and other fretted or non-fretted musical instruments.

Referring to FIGS. 5 and 6, the vertical placement (longitudinal along the neck 502) placement of the light strips 102 is such that they can accommodate many neck lengths (scale sizes) in the particular class (such as full-size guitars) of fretted instrument.

The horizontal placement (parallel to the frets 504) of the light strips 102 and in particular the light elements 104 in the light strips 102 is such that they will be approximately underneath their corresponding strings 506 in the particular class (such as full-size guitars) of instrument 500. In this manner, a particular light element 104 in a light strip 102 will be aligned with a particular string 506. For example, the number of light elements 104, such as LEDs, in a light strip 102, will correspond to the number of strings 506 of the guitar 500.

At least the LED element portion 104 of the device 100 is held securely in place using, for example, a semi-permanent adhesive between the musical instrument 500 and the device 100. This adhesive can be applied at specialized manufacturing facilities and covered with a protective tape for transit. This tape is removed just prior to installation by the end user. The adhesive is configured to not damage the finish of instrument to which the device 100 is applied. Some adhesive options may allow the device 100 to be removed at least once and re-applied to another instrument as long as dust, hair, or other particles are not allowed to come in contact with the adhesive once it is removed from the original instrument. The device 100 is configured to be portable and configured to be capable of multiple uses as well as applications.

In the example of FIGS. 5 and 6, some electronics of the fret lighting display device 100 are mounted to a flexible circuit board (FPCB) that is part of the connecting strip 106. In this manner, the fret lighting display device 100 can wrap around the edge of the neck portion 504 of the guitar 500.

In one embodiment, the fret lighting display device 100 of the disclosed embodiments has a shape and a size that is approximately 15" long×2" in width In one embodiment, the separate battery and control module 402 is approximately 3" long×2' wide×0.5" deep. In one embodiment, the fret lighting display device 100 weighs less than about 1 oz. In one embodiment, the battery and control module 402 of the assembly 400 weighs less than about 3 oz. While other sizes and weights are within the scope of contemplation, the device 100 and assembly 400 of the disclosed embodiments is generally intended to be small and portable. Thus, the device 100 of the disclosed embodiments can have any suitable size, shape and weight that achieves such a portable configuration. Primarily this will include decreasing or increasing the number of lighting strips 102 included in the fret lighting display device 100.

The device 100 can have any suitable color and finish. Some example of finishes can include, but are not limited to, rubberized matte, chrome or paper with different graphics (patterns, wood-patterned, etc.).

In one embodiment, the fret lighting display device 100 is coupled or connected to a smartphone device 420 or computer via a suitable wireless platform or connection 422. In one embodiment, the wireless platform 422 comprises one or more of a BLUETOOTH™, WiFi™, or another wireless communication method. In one embodiment, the fret lighting display device 100 will be enabled with companion application, also known as the FRET ZEALOT™ application. Using the application on the person's mobile or computing device, the person will choose what pattern or music to display on the device 100. The pattern(s) is then presented on the fret lighting display device 100. In particular, the different light elements 104 of the different light strips 102 will illuminate in accordance with the selected or programmed pattern(s). In this manner, when the light element (s) 104 illuminate, the user can place their fingers accordingly. This will guide the learning and playing process.

Figure 12:
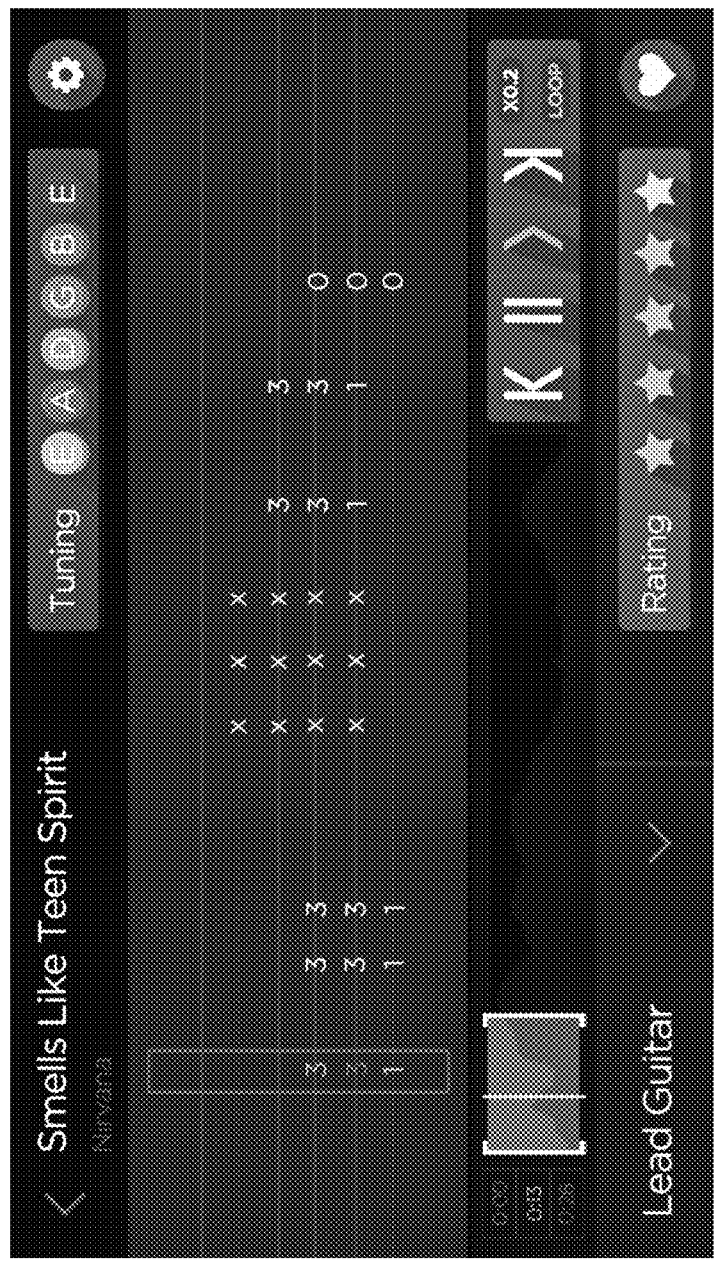
FIGS. 12-13 are screen shots taken from a display of a mobile application for the exemplary fret lighting device incorporating aspects of the disclosed embodiments.
Figure 13:
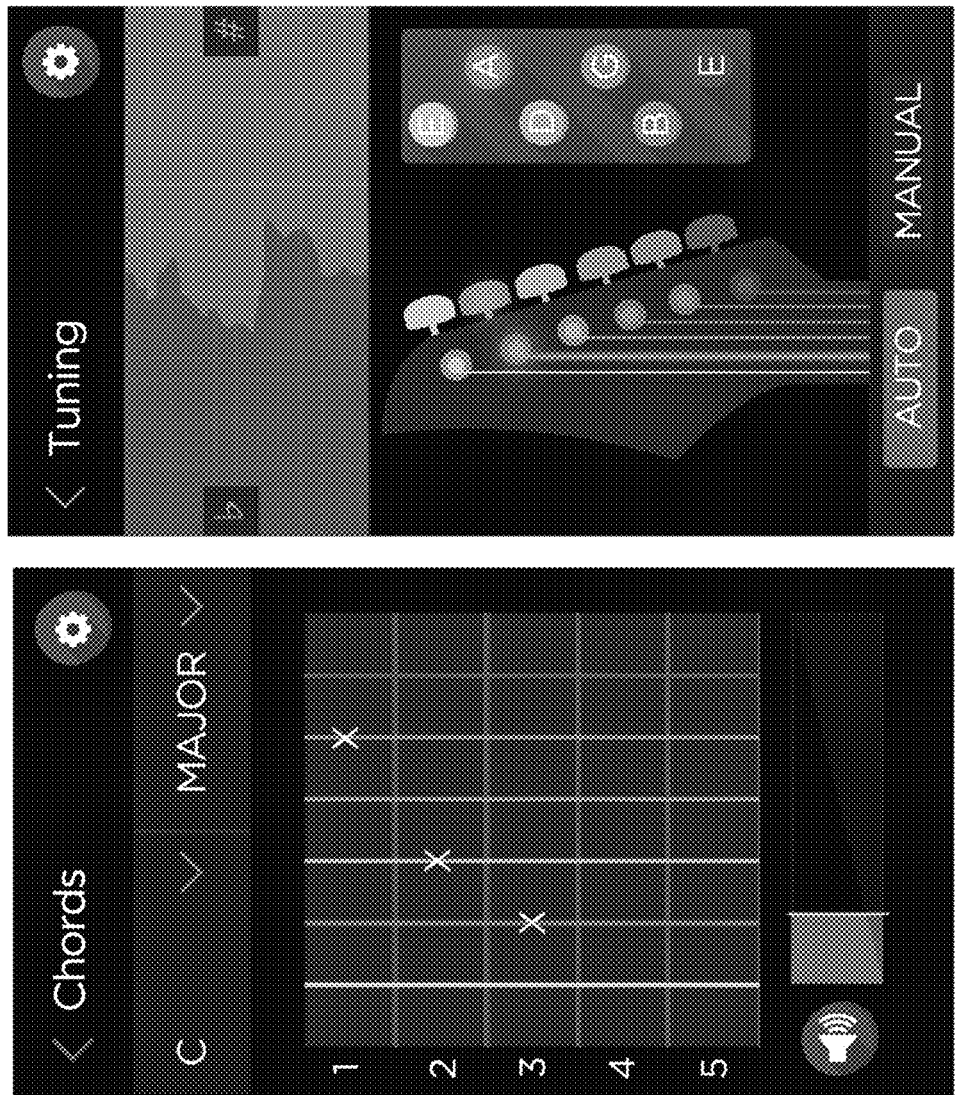

The user has many display options to choose from. After the selection is made, transmission of the display instructions to the fret display device 100 takes a fraction of a second due to the computer or smartphone's powerful processor and is substantially immediately displayed or otherwise presented to the user, as is generally shown in the sequence of exemplary screen shots in FIGS. 12-13. FIGS. 12 and 13 illustrate exemplary screen shots of the user application interface for the device 100 of the disclosed embodiments. The different screens, which can be presented on a display of the user's computing device, mobile communication device or smartphone, can provide general instructions as to the operation of the device 100 and the user interaction with the device 100.

As is shown in FIGS. 12 and 13, the device 100, in combination with the mobile app, has a primary function of showing the user how to play from a collection of notes, chords, and songs in various tunings. In alternate embodiments, the various information, settings and results can be presented in any suitable manner on any number of screens or pages.

The app controls all aspects of the LEDs 104. The user may use the app to display any combination of notes, chords, or light effects in any color. The app also maintains a live connection to stream data to display songs or corresponding data from a lesson in the app. Future features may be added to the app and pushed to users' devices remotely.

While a smartphone device is referred to herein, the aspects of the disclosed embodiments are not so limited. The reference to a smartphone device can generally include any mobile computing or communication device, such as mobile telephones, smart phones, tablets, pads, phablets, smart computing devices and other mobile communication and computing devices in general.

While a computer is referred to herein, the aspects of the disclosed embodiments are not so limited. The reference to a computer can generally include any processor based computational device, such as notebook computers, laptop computers, desktop computers, lighting system controllers, microcontrollers, wireless control systems, and other computing devices capable of wired or wireless communication in general.

The communication between the controller 402 and the device 100 can be any suitable communication protocol. While BLUETOOTH™ is generally referred to herein, the aspects of the disclosed embodiments are not so limited. Other communications other than including BLUETOOTH™ are contemplated. This can include WiFi™ and ZIGBEE™, for example.

The device 100 of the disclosed embodiments may be instructed to display any number styles of light shows. The individual light elements 104 or LEDs are capable of displaying any color as possible by RGB LEDs, which use combinations of the primary colors Red, Blue, and Green to display any color in the visible color spectrum.

The device 100 is capable of displaying many different levels of brightness. Each LED 104 and color is controlled independently, so the cumulative display encompasses a tremendous number of display possibilities.

Figure 14:
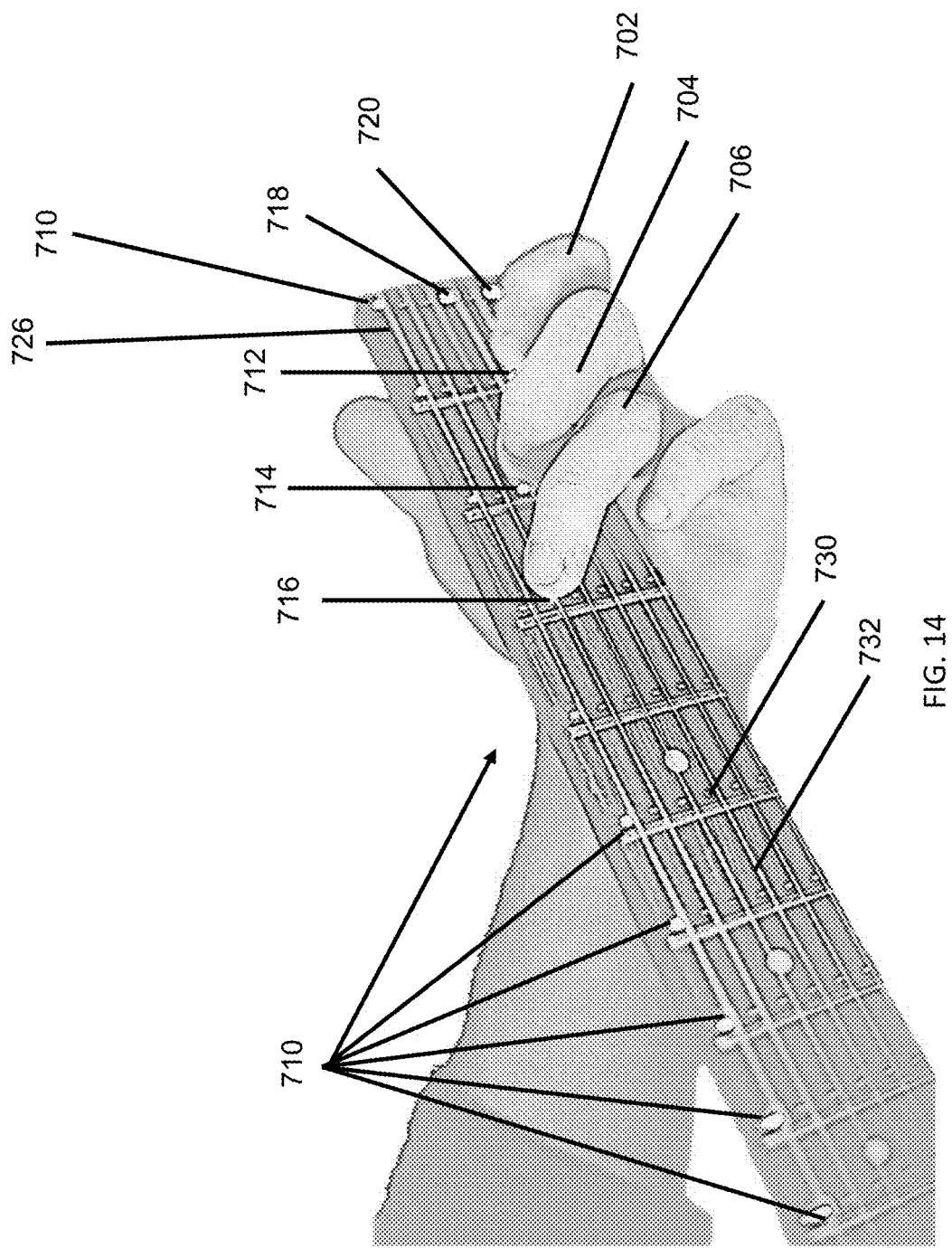
FIG. 14 illustrates a use of the exemplary fret lighting device incorporating aspects of the disclosed embodiments.

FIG. 14 illustrates an exemplary use of the device 100 of the disclosed embodiments. FIG. 14 shows the display of a "C" major chord where the appropriate locations for the index finger 702 is indicated by illuminated LED 712, which in this example is a blue colored LED. The appropriate location for the middle finger 704 is indicated by a illuminated LED 714, which in this example is a green LED, and the appropriate location for the ring finger 706 is indicated by illuminated LED 716, which in this example is a yellow LED. The two illuminated LEDs 718, 720 at the top of the fret board indicate "open" strings (meaning they are strummed, but do not have a finger applied to them) and are colored white in this example. The group 710 of illuminated LEDs running down or under the top string 726 is used to indicate a "mute" string (that the string is not played when playing the "C" major chord in this example). In alternate embodiments, the various information, settings and display can be presented in any suitable manner with any variety of colors or patterns, both static or dynamic. Although certain colors are referred to herein, the aspects of the disclosed embodiments are not so limited and any colors can be used for different LEDs. The remaining LEDs 104, such as LED 730, are not illuminated, meaning the corresponding string 732 is not pressed.

One example of a process using the device 100 of the disclosed embodiments includes:

The device 100 is supplied power via a mechanical switch or button command on the computer and control module 402, once connected to form the assembly 400.

The device 100 establishes a communication connection with a computing or mobile device via a communication protocol such as BLUETOOTH™ or WiFi™. The computing or mobile device is running an application that is compatible with the device 100

The user may now interact with and control the device 100 via their mobile device or other computer device. The light elements 104 on each light strip 102 will illuminate and guide the user on where to place their fingers in order to play the guitar 500.

In summary, some of the key aspects of the device 100 and process of the disclosed embodiments include:

Power is supplied via the computer and control module 402.

The computer and control module allows wireless communication between the device 100 and a control computer or mobile device.

The device 100 displays LEDs and LED patterns as specified by the user.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A learning device assembly for a stringed instrument, comprising:

one or more light strip members that are configured to be removably attached to an exterior facing surface of a fret board of the stringed instrument;

at least one light element in the one or more light strips;

one or more micro-controllers, wherein individual ones of the one or more micro-controller are electrically connected to a corresponding end of a respective one of the one or more light strip members;

a flexible circuit board connecting strip member electrically connected to the one or more micro-controllers, the flexible circuit board connecting strip member being removably attached to an external surface of the stringed instrument along a length of a side of a neck of the stringed instrument;

a controller electrically connected to an end of the flexible circuit board connecting strip member away from an other end of the flexible circuit board strip member electrically connected to the one or more micro-controllers and configured to electrically drive the one or more micro-controllers to drive the at least one light element in the one or more light strip members; and a computing device communicatively coupled to the controller, the computing device configured to be programmed with one or more music arrangements and enable the controller to cause the one or more micro-controllers to illuminate individual ones of the at least one light element in the respective ones of the one or more light strip members according to a particular one of the one or more music arrangements.

2. The learning device assembly according to claim 1 wherein the at least one light element comprise comprises a Light Emitting Diode (LED).

3. The learning device assembly according to claim 1 wherein the computing device is a mobile communication device that is running an application that is configured to control an illumination of the at least one light element in one or more light strip members according to the particular one of the one or more music arrangements.

4. The learning device assembly according to claim 1 wherein the at least one light element is disposed on one side of the one or more light strip members and an other side of the one or more light strip members comprises an adhesive.

5. The learning device assembly according to claim 1 wherein the one or more light strip members are removably connected to the connecting member.

6. The learning device assembly according to claim 1, wherein the one or more light strip members are configured to be removably disposed on the exterior facing surface of the fret board adjacent to, and horizontally aligned relative to, a fret member of the stringed instrument.

7. The learning device assembly according to claim 6, wherein a number of the one or more light strip members corresponds to a number of frets on the stringed instrument.

8. The learning device assembly according to claim 1 where a light element of the at least one light element is aligned with a respective string of the stringed instrument.

9. The learning device assembly according to claim 8 wherein a number of light elements in a light strip member corresponds to a number of strings of the stringed instrument.

10. The learning device assembly according to claim 1, wherein the at least one microcontroller is configured to drive a respective light element based on non-transitory computer readable instructions received from the controller.

11. The learning device assembly according to claim 10, wherein the at least one microcontroller is configured to illuminate different ones of the at least one light element at different times and for different time periods based on the non-transitory computer readable instructions received from the controller.

12. The learning device assembly according to claim 1, wherein the stringed instrument is selected from the group consisting of a guitar, bass guitar or ukulele.

13. The learning device assembly according to claim 1, wherein the flexible printed circuit board connecting member is configured to wrap at least partially around an exterior facing surface of a neck member of the stringed instrument including a surface radius of a top side of a neck of the stringed instrument.

14. The learning device assembly according to claim 13, wherein the flexible printed circuit board connecting member is arranged perpendicular relative to the one or more light strip members.

15. The learning device according to claim 1, wherein the controller is configured to cause an illumination of different light elements of the at least one light element that correspond to different strings of the string musical instrument as programmed by the mobile application on the computing device and guide the user as to pressing of the different strings to play different chords.

16. The learning device according to claim 1, wherein the controller is configured to cause an illumination of different light elements of the at least one light element corresponding to one or more of musical instruction or light effects based on programming instructions received from the computing device.

17. The learning device according to claim 1, wherein illumination of the individual ones of the at least one light element follows a pattern that is provided by the computing device.

18. The learning device assembly according to claim 1 where a light element of the at least one light element is configured to be variably positioned relative to a string of the instrument.

* * * * *